United States Patent [19]

Van Mechelen

[11] 4,167,367
[45] Sep. 11, 1979

[54] IMPACT TURBINE

[76] Inventor: Bernard Van Mechelen, 704 Bertsch Ave., Crescent City, Calif. 95531

[21] Appl. No.: 832,632

[22] Filed: Sep. 12, 1977

[51] Int. Cl.² ............................................. F01D 17/14
[52] U.S. Cl. ..................................... 415/92; 415/151; 60/639
[58] Field of Search ...................... 415/36, 30, 42, 127, 415/148, 151, 159, 173, 198.2, 14, 92; 417/329, 426, 203, 236; 60/639; 290/54

[56] References Cited

U.S. PATENT DOCUMENTS

| | | | |
|---|---|---|---|
| 51,321 | 12/1865 | Kendrick | 415/203 |
| 80,874 | 8/1868 | Pike | 415/203 |
| 118,307 | 8/1871 | Wait | 415/159 |
| 225,577 | 3/1880 | Drawbaugh | 415/151 |
| 255,720 | 3/1882 | Christy et al. | 415/151 |
| 397,096 | 1/1889 | Studte | 415/148 |
| 470,489 | 3/1892 | Henkel | 415/151 |
| 663,812 | 12/1900 | Jones | 415/151 |
| 719,305 | 1/1903 | Collins | 415/92 |
| 977,264 | 11/1910 | Blackwell | 415/203 |
| 1,524,431 | 1/1925 | Grady | 415/36 |
| 3,066,488 | 12/1962 | Mock | 415/159 |
| 3,396,904 | 8/1968 | Janette | 415/159 |
| 3,958,130 | 5/1976 | Van Mechelen | 60/639 |

Primary Examiner—Louis J. Casaregola
Attorney, Agent, or Firm—Clarence M. Crews

[57] ABSTRACT

A water collecting reservoir, desirably located at a considerable elevation, is constructed and arranged periodically to deliver water downward to an annular generator chamber which includes a fixed outer circular shell and a complementary, inner rotary shell, the latter shell being fixed on a rotary horizontal shaft which may be constantly driven by the water through pistons affixed to the inner shell. The rotary shaft is arranged periodically to open and close a valve for timing the admission of measured quantities of water to drive the generator.

5 Claims, 7 Drawing Figures

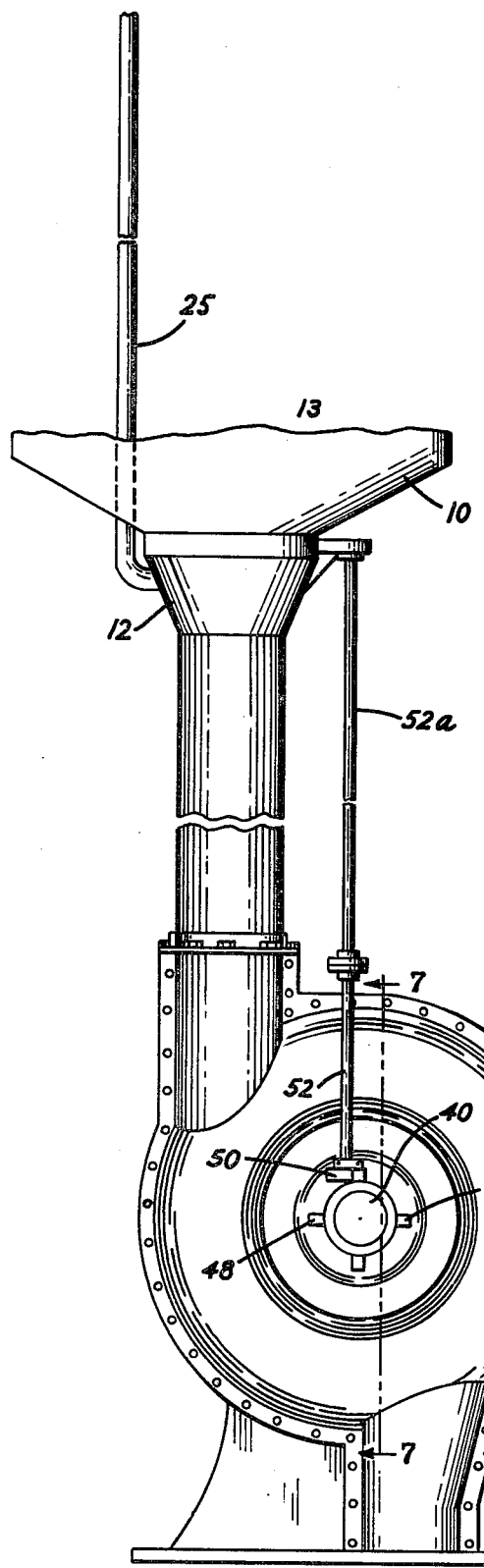
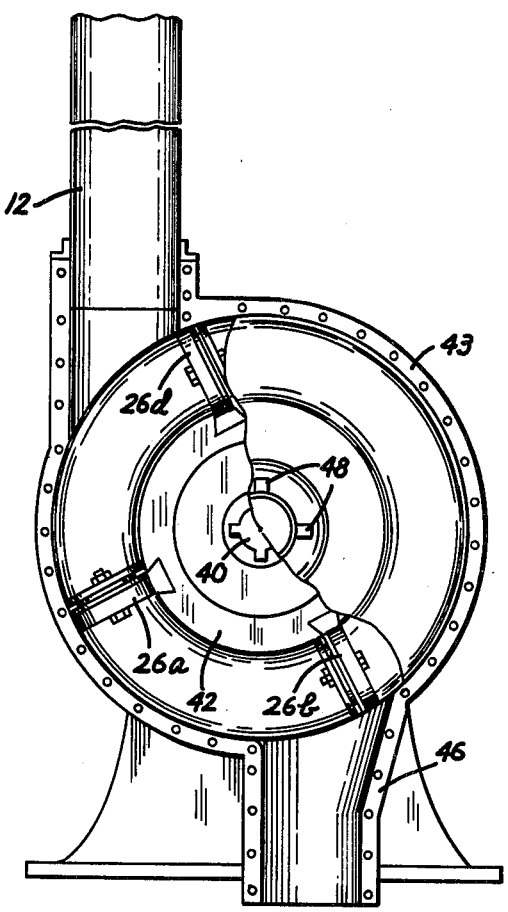
Fig. 2.
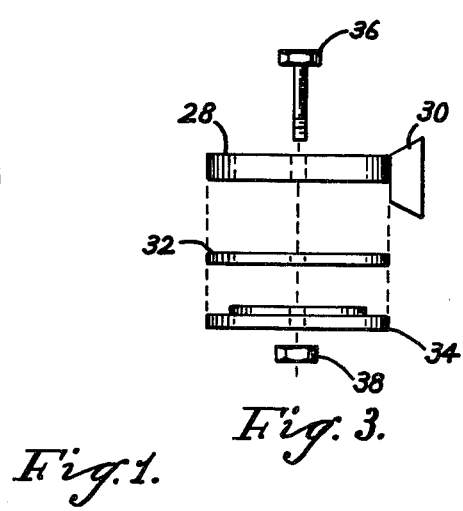
Fig. 3.
Fig. 1.

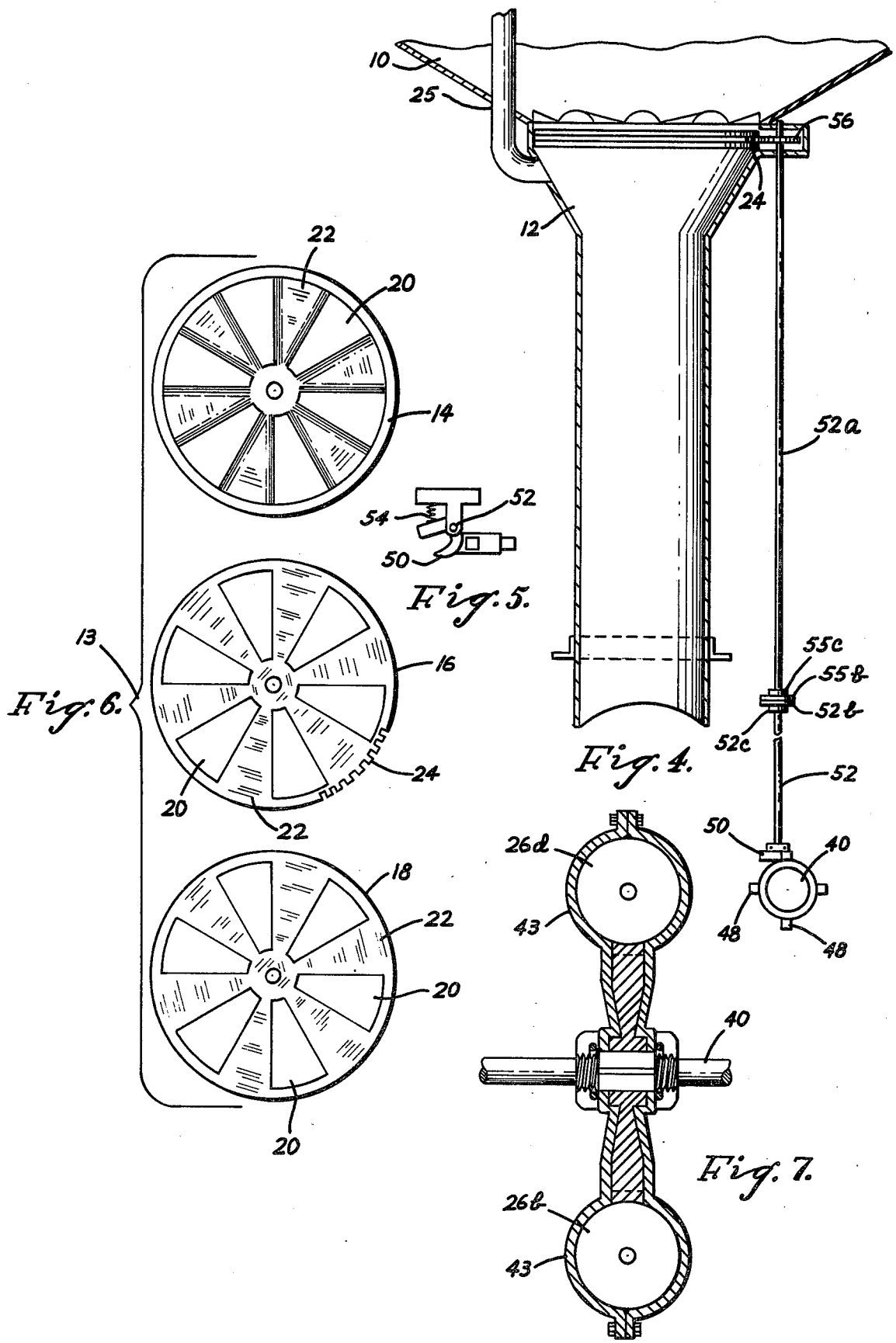

IMPACT TURBINE

The present invention relates to a water powered electrical generator and is in the nature of an improvement upon the generator disclosed and claimed in my U.S. Pat. No. 3,958,130 of May 18, 1976. In accordance with that patent, water located at a considerable elevation is caused to flow downward intermittently between constantly driven rollers having opposed alternate flat and circular segments, into buckets carried on arms of a generator shaft. Each bucket comprises two pivotally connected, complementary segments which are caused to divide for spilling the contained water near bottom dead center.

The patented arrangement is a practical and advantageous one but it has the drawbacks (1) that each bucket is composed of two separable segments between which some ill-timed leakage can occur, and (2) that the buckets, being pivotally mounted, can swing on their pivots and thus spill some of their contents prematurely, or fail to receive water which they were intended to receive. These potential drawbacks are overcome by the present invention.

In accordance with the present invention an impact turbine is provided having a water supply chamber at or near the bottom of a reservoir, lake or other body of water located at a substantial elevation. A water operated valve times the downward discharge of water to an impact turbine.

The impact turbine includes an annular chamber made up of a stationary, circular outer shell, and a rotary annular inner shell on which latter shell a plurality of driving pistons are affixed at uniform intervals.

The inner shell also drives valve mechanism which controls the timed delivery by gravity of water to the turbine, the timing being such that a chamber between pistons is substantially filled with water exerting an impact for driving the pistons and their carrying ring forward while avoiding reverse impact upon the piston carrying ring.

Provision is made of an air inlet connection from above the water supply level to a point just below the valve, so that the driving impact exerted by the water upon the pump will not be opposed by a vacuum effect.

When a given charge of water has driven the output shaft through a quarter turn, the water is discharged and collected and may be again utilized in a similar hydraulic mechanism at a lower level. The mechanism may be duplicated again and again, depending upon the initial elevation of the water and the character of the terrain.

Successive turbines are not necessarily or ordinarily vertically aligned, since the water may flow for a considerable distance between successive generating units.

An output shaft may serve as the drive shaft of an electrical generator, or it may be utilized for directly delivering mechanical power.

Other objects and advantages will hereinafter appear.

In the drawing forming part of this specification,

FIG. 1 is a comprehensive, fragmentary view, in elevation, partly broken away, of my novel generator mechanism;

FIG. 2 is a view in elevation, partly broken away, in part duplicative of FIG. 1 but particularly showing details which are not shown in FIG. 1;

FIG. 3 is an exploded view of one of the pistons employed in the generator of FIGS. 1 and 2;

FIG. 4 is a detail view showing particularly valve operating means for controlling the intermittent delivery of water;

FIG. 5 is a fragmentary view showing in further detail a portion of the timing mechanism of FIG. 4;

FIG. 6 is a collection of three cooperative valve parts which are superposed in the machine; and FIG. 7 is a vertical sectional view through mechanism best illustrated in FIG. 2.

All of the water with which the illustrative mechanism is expected to deal may initially be assumed to form a puddle, pond or reservoir having an outlet member 10 desirably at its lowest point.

A funnel-like device 12 is arranged to permit or to prevent the downward gravity discharge of water from the member 10.

At the upper end or mouth of the member 12 there is provided a three disc flow control device 13. The three discs from top to bottom are designated 14, 16 and 18, respectively. The three discs are alike in construction, each having six equal open segments 20 and six equal closed segments 22. As shown, the open and closed segments are of equal angular extents, so that each segment illustratively has an angular extent of only thirty degrees. Thus full opening and complete cut-off may be quickly established.

The discs 14, 16 and 18 are mounted horizontally between the members 10 and 12 upon a common vertical shaft 12a. The discs 14 and 18 are stationary, but the disc 16 has teeth 24 that may extend completely around its periphery, but that are not required to do so, since the function of the teeth is to oscillate the disc 16 through an angle of approximately thirty degrees between a fully open position and a fully closed position.

In the idle position the valve member 16 stands in the closed condition so that no water is being delivered to the turbine.

A constantly open air supply conduit 25 leads downward from a point above the water level in the member 10, or the body of water which supplies the member 10 and communicates with the interior of the member 12 below the valve members 14, 16, 18 so that any water which has passed the valve will always be free to travel downward, subject only to retardation by one of four identical, equally spaced, pistons 26a, 26b, 26c and 26d.

Each of the pistons referred to comprises a cylindrical base member 28 (FIG. 3), which member includes a dove-tail anchoring and driving portion 30, a friction disc 32, a retaining disc 34, a headed screw 36, and a retaining nut 38. Each piston alternately drives, and is driven by and in unison with, a shaft 40, being carried at the outer end of a disc 42 fast on the shaft.

The shaft 40 can be locked against rotation, but when it is free to rotate it is driven counterclockwise, as viewed in FIGS. 1 and 2, by water which is supplied from the water outlet member 10.

As viewed in FIG. 2, the piston 26a is being driven downward but the water supply has been cut off by rotation of the valve member 16 to the cut-off position. This does not, however, tend to arrest rotation of the member 42 and the pistons carried by it in a turbine casing 43 because air is freely admitted to the chamber formed by the member 12 through air admission member 25 which is always open. The quantity of water delivered at each delivery cycle is desirably just sufficient to fill the space between two adjacent pistons, so that back pressure is essentially avoided.

As the piston 26a is driven forward toward a water discharge member 46, projections 48, disposed at ninety degree intervals on the shaft 40, are advanced in unison with the shaft.

As each projection 48 approaches top dead center, it impinges upon a member 50 causing a shaft 52 to be rocked clockwise against the resistance of a coil spring 54. An extension shaft 52a, connected to operate in unison with the shaft 52, has fast on its upper end a pinion 56 which, through the teeth 24, causes the valve member 16 to be moved to closed position for a short time, thereby interrupting the delivery of water past the composite valve 14–16–18. As soon as a pin 48 clears the member 50, however, the shaft members 52–52a are snapped back to valve opening position and the delivery of water past the valve 14–16–18 is resumed.

It should be noted that the timing is so regulated that the delivery of water to the turbine will be interrupted at just about the time that a piston attains the position occupied by the piston 26d in FIG. 2, so that little or no back pressure will be exerted upon a piston situated like the piston 26d in that figure.

The timing of the valve 14 can be adjusted with precision for producing the most desirable results. This is done by making provision for angularly adjusting the shaft 52a which carries the pinion 56 relative to the shaft 52. As will be apparent, discs 52b and 55b threaded on the respective shafts 52 and 52a can be backed off from engagement with one another, and the shaft 52a can then be adjusted to adjust and maintain the timing of the shaft 52a and the gear disc 16. The discs 52b and 55b can be pressed firmly together in any desired angular relation of the shafts and fixed in relation to the shafts and to one another by lock nuts 52c and 55c. The discs and lock nuts desirably have left-hand threads.

I have described what I believe to be the best embodiment of my invention. What I desire to cover by Letters Patent, however, is set forth in the appended claims.

I claim:

1. A water driven electrical power generating system comprising, in combination,
   (a) a downwardly extending water intake member adapted to receive water at its upper end,
   (b) segmental intake valve means, disposed across said intake member and including segments which are operable through a small angle between a position in which the downward passage of water is completely blocked and a position in which the downward passage of water is freely permitted,
   (c) a turbine body having a fixed outer circular wall and a rotary inner circular wall, the inner and outer circular walls jointly bounding an annular space,
   (d) a rotary output generator shaft on which the inner circular wall is made fast;
   (e) a series of traveling pistons affixed at uniformly spaced intervals to the inner circular wall and necessarily rotatable in unison with the inner circular wall in the annular space between the rotatable inner and the stationary outer circular walls,
   (f) an output shaft driven by the pistons through the inner circular wall, and
   (g) means operable by the piston driven shaft periodically to open and to close the upper end of the water admission member.

2. A water driven electrical power generating system as set forth in claim 1 which further includes an air inlet conduit that extends from a point above the surface of the source of water supply to a point in the intake member below said valve means.

3. A water driven electrical power generating system as set forth in claim 1 in which provision is made for timing the operation of the valve means to supply water in measured quantities to a downgoing segment of the annular space between pistons, substantially appropriate in quantity to fill such space.

4. A water driven electrical power generating system as set forth in claim 3 in which provision is made of means for adjusting the timing of the water admission means relative to the timing of the pistons.

5. A water driven electrical power generating system as set forth in claim 1 in which four equally spaced rotary pistons are provided, and the water admission valve means is automatically held open just long enough to deliver a quantity of water sufficient substantially to fill the space between pistons.

* * * * *